April 2, 1963  J. F. HELY  3,083,432
PRODUCTION OF SOAP TABLETS
Filed Aug. 6, 1958
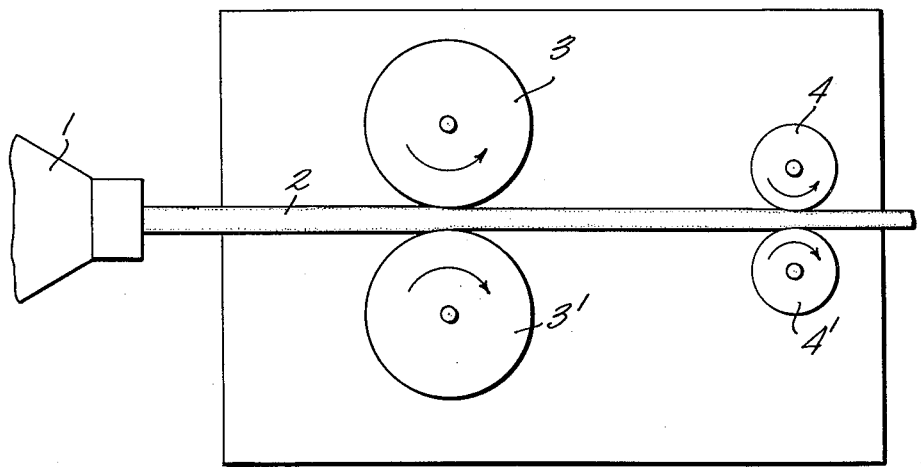
INVENTOR.
J. F. HELY
BY Brumbaugh, Free, Graves & Donohue
His ATTORNEYS.

3,083,432
PRODUCTION OF SOAP TABLETS

John Frederick Hely, Sydney, New South Wales, Australia, assignor to Lever Brothers Company, New York, N.Y., a corporation of Maine
Filed Aug. 6, 1958, Ser. No. 753,455
6 Claims. (Cl. 25—8)

This invention relates to the production of soap tablets and in particular to imparting sheen to soap tablets.

In the manufacture of soap tablets, the molten 63% soap is solidified and reduced to chips or ribbons, which are, if it is desired to produce toilet soap, dried to a fatty matter content of 75 to 82%. The chips or ribbons are then milled or refined, thereafter plodded, i.e. compressed into a compact homogeneous mass which is extruded as a bar through a die plate, cut into billets and then stamped.

It is an object of the present invention to provide a process for imparting sheen to the extruded bar.

We have found that by passing the bar between two smooth, uninterrupted surfaces which exert a transverse pressure on the bar and which move at a speed greater than and in the same direction as that of the bar, a sheen is imparted to the contacted surfaces of the bar.

The present invention therefore provides a process for imparting sheen to soap bars which includes the steps of extruding the soap in bar form and passing it between two smooth, uninterrupted surfaces which exert a transverse pressure on the bar and which move at a speed greater than and in the same direction as that of the bar.

The present invention also provides a method for imparting sheen to soap bars which includes the steps of extruding the bar and passing it between at least two members having smooth, uninterrupted surfaces which are spaced nearer to one another than the corresponding external surfaces of the extruded bar and which move in the same direction as and at a speed greater than that of the bar.

The members may be constituted by cylindrical rollers or belts.

Preferably, the bar passes through at least two pairs of members in series. In that case, each pair of members should exert less force on the bar than the preceding pair.

The invention applied to the production of toilet soap bars will now be described in greater detail with reference to the accompanying drawing which shows diagrammatically a plan view of the apparatus.

The soap chips having approximately 80% total fatty matter were placed in the hopper (not shown) of a conventional plodder 1 and extruded through its die plate in the form of a bar 2 of rectangular cross section.

The dimensions of the die plate opening were height 1⅞" and width 1¾". The speed of extrusion was approximately 54 ft./min. corresponding to an extrusion rate of approximately 1.7 tons per hour. After passing through the die plate, the soap expanded by approximately 1/16" on each dimension.

The bar, which had a height of 1 15/16" and width of 1 13/16" was then passed through the first pair of rollers 3, 3'. These rollers were made from cast iron and their surfaces had a fine machine finish. The rollers were spaced 1 5/16" apart and the height and width of the bar after passage between them were 1 31/32" and 1 11/32" respectively. The rollers 3, 3' were driven by a variable speed motor and their surface speed was 15–20% in excess of the linear speed of the bar as it passed through the rollers.

The bar was then passed through a second pair of rollers 4, 4'. These rollers were also made from cast iron and had a ground finish. The rollers were spaced 1 5/16" apart and the height and width of the bar after passage between them were 1 31/32" and 1 5/16". Thus the second pair of rollers merely "polished off" the expansion after the first pair of rollers. The rollers 4, 4' were also driven by a variable speed motor and their surface speed was about 40% in excess of the linear speed of the bar as it passed through the rollers.

In the past, hand rubbing has been the most widely used method for polishing soap. U.S. Patent No. 2,713,188 described a mechanical method for polishing soap. The method of that patent, however, is quite different from that of the present invention. In the method of the patent, the soap is passed through two flat platens which do not rotate as do the rollers of the present invention. Furthermore, unlike the rollers of the present invention, the platens of the prior art were supported for yielding movement in a direction transverse to the feed of the soap.

The sheen produced on the surface of the soap bar by the process of the present invention was not lost when the bar was cut into billets, which were then stamped in a soap press. Moreover, soap having its surface treated by this process proved capable of being cut into billets and stamped whilst hot, i.e. the treatment also caused hardening of the soap surface. This is particularly important in a hot humid climate where difficulties are frequently encountered in stamping soap billets. In the particular process described above, the billets were cut and stamped immediately after surface treatment, the air temperature being 80–90° F. and the relative humidity above 70%.

The temperatures of the plodded soap varied between 114° F. and 130° F. At the lower temperature the plodding rate was considerably reduced—the variation of the plodding rate from maximum to minimum being about 20%.

It was found that it was possible to increase the excess speed of the rollers and hence to improve the sheen, by heating them. However, when the roller temperature was more than about 10° F. higher than that of the extruded bar, the surface of the bar tended to stick to the rollers.

Although the specific embodiment described utilized rollers driven by a source of power, it is possible to utilize the force of the extruded bar. Thus the extruded bar may, for example, be passed through a first pair of rollers which is coupled by a variable speed drive (for example of the cone type) to a second pair, which in turn is coupled to a third pair, no external source of power—other than the bar—being employed.

Moreover, though the invention has been described with reference to cast iron rollers, other materials may also be suitable, and it may be advantageous to coat the rollers, for example by a plating process with chromium or with a synthetic plastic, e.g. polytetrafluoroethylene (Teflon). Laminating a material such as chamois leather may also produce useful results.

What is claimed is:

1. A process for imparting sheen to soap bars which comprises the steps of extruding the soap in bar form and passing it between at least one pair of cylindrical rollers having smooth, uninterrupted surfaces which exert a transverse pressure on the bar and which move at a speed greater than and in the same direction as that of the bar.

2. A process for imparting sheen to soap bars which comprises the steps of extruding the soap in bar form and passing it through at least two pairs of cylindrical rollers having smooth, uninterrupted surfaces, the surfaces of each pair of rollers being spaced nearer to one another than the corresponding external surfaces of the extruded bar, and moving in the same direction as and at a speed greater than that of the bar.

3. A process as claimed in claim 2 in which the rollers are heated to a temperature above room temperature but not more than about 10 Fahrenheit degrees higher than the temperature of the extruded bar.

4. A process according to claim 1, wherein the surfaces are the cylindrical surfaces of a pair of cast-iron rollers.

5. A process according to claim 2, wherein both pairs of rollers are of cast-iron, the surfaces of the first pair having a fine machine finish and those of the second pair having a ground finish.

6. A process for imparting sheen to soap bars comprising extruding the soap in the form of a bar and passing said bar between at least one pair of members each having a smooth, uninterrupted surface, said surfaces being in contact with opposite sides of the soap bar and spaced apart a distance less than the spacing between said opposite sides of the soap bar, as extruded, said surfaces being moved in the same direction as said soap bar and at a speed greater than that of the bar.

References Cited in the file of this patent

UNITED STATES PATENTS

| | | |
|---|---|---|
| 837,717 | Perry | Dec. 4, 1906 |
| 1,476,772 | Schwantes | Dec. 11, 1923 |
| 2,585,156 | Montross | Feb. 12, 1952 |
| 2,620,513 | Cryor et al. | Dec. 9, 1952 |
| 2,713,188 | Garvey | July 19, 1955 |
| 2,821,746 | Bicher | Feb. 4, 1958 |

FOREIGN PATENTS

| | | |
|---|---|---|
| 512,026 | Canada | Apr. 19, 1955 |
| 181,497 | Germany | Feb. 23, 1907 |
| 220,822 | Great Britain | Aug. 28, 1920 |